United States Patent
Reigl et al.

(10) Patent No.: US 10,865,643 B2
(45) Date of Patent: Dec. 15, 2020

(54) METHOD AND SYSTEM FOR A COMPONENT LIFETIME COUNTER

(71) Applicant: General Electric Technology GmbH, Baden (CH)

(72) Inventors: Martin Reigl, Ehrendingen (CH); Johann Sigurd Kubel, Ennetbaden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 8 days.

(21) Appl. No.: 16/159,827

(22) Filed: Oct. 15, 2018

(65) Prior Publication Data

US 2020/0116024 A1 Apr. 16, 2020

(51) Int. Cl.
*F01D 1/26* (2006.01)
*F16K 37/00* (2006.01)
*G05B 23/02* (2006.01)

(52) U.S. Cl.
CPC ............ *F01D 1/26* (2013.01); *F16K 37/0083* (2013.01); *G05B 23/0283* (2013.01); *F05D 2220/31* (2013.01); *F05D 2260/80* (2013.01); *F05D 2270/303* (2013.01)

(58) Field of Classification Search
CPC ... F01D 1/26; F16K 37/0083; G05B 23/0283; Y10T 137/86638
See application file for complete search history.

(56) References Cited

U.S. PATENT DOCUMENTS

| | | | | |
|---|---|---|---|---|
| 5,566,091 A | * | 10/1996 | Schricker | F01N 11/002 340/439 |
| 7,065,471 B2 | * | 6/2006 | Gotoh | F02C 7/00 700/287 |
| 7,715,991 B2 | * | 5/2010 | Potdar | G01M 5/0033 702/34 |
| 8,943,222 B1 | * | 1/2015 | Scharler | G05B 19/0428 709/246 |
| 2014/0196462 A1 | * | 7/2014 | Nguyen | G05B 23/0272 60/772 |
| 2018/0058248 A1 | | 3/2018 | Reigl | |
| 2018/0058250 A1 | | 3/2018 | Reigl | |
| 2018/0058251 A1 | | 3/2018 | Reigl | |
| 2018/0058256 A1 | | 3/2018 | Reigl | |

* cited by examiner

*Primary Examiner* — Kevin R Barss
(74) *Attorney, Agent, or Firm* — Armstrong Teasdale LLP

(57) ABSTRACT

A method of determining a remaining life in a component and a rotatable machine system are provided. The rotatable machine system includes a plurality of valves coupled in flow communication with a rotatable machine of the rotatable machine system, a plurality of sensors configured to receive operating parameters associated with the rotatable machine and the plurality of valves, and an online valve lifetime counter (OVLIC), including a processor communicatively coupled to the plurality of sensors. The OVLIC is configured to determine a trend of differential temperature across a body of a valve of the plurality of valves, convert the trend of differential temperature to a stress induced into the valve over time, and determine life remaining in the valve based on a total damage of the valve wherein the total damage is a function of creep damage and fatigue damage to the valve.

17 Claims, 8 Drawing Sheets

METHOD AND SYSTEM FOR A COMPONENT LIFETIME COUNTER

BACKGROUND

The field of the disclosure relates generally to monitoring and control systems for rotatable machines and more particularly to a method and system for a component lifetime counter based upon in service conditions of the component.

A steam turbine converts the kinetic or thermal energy of pressurized steam into useful mechanical work. Generally described, the steam is created in a steam generator or a boiler, passes through control valves and stop valves into the turbine sections, and drives a rotor assembly. The rotor assembly then in turn may drive a generator to produce electrical energy or the like. The control valves and the stop valves control the operation of the steam turbine by controlling the flow of the steam into the sections. A control valve typically controls or regulates the volumetric flow and/or the pressure of the steam entering into the sections during normal operation levels. A stop valve is typically a safety valve that is held open during normal operation and closed when immediate shutdown is necessary. In some applications, the control valve and the stop valve may be integrated into a single unit.

Due to market demands, steam turbines may be required to operate with increased cycling and longer inspection intervals. In order to obtain significant information about the condition of the steam turbine components, including the control valves and the stop valves, condition monitoring systems may be used. Such monitoring systems, however, may be of only limited value in that certain types of component wear or damage may only be apparent via visual inspection during a system shutdown. However, such outage costs and time may be significant.

BRIEF DESCRIPTION

In one aspect, a rotatable machine system includes a plurality of valves coupled in flow communication with a rotatable machine of the rotatable machine system, a plurality of sensors configured to receive operating parameters associated with the rotatable machine and the plurality of valves, and an online valve lifetime counter (OVLIC), including a processor communicatively coupled to the plurality of sensors. The OVLIC is configured to determine a trend of differential temperature across a valve body of the plurality of valves, convert the trend of differential temperature to a stress induced into the valve over time, and determine an estimated life remaining in the valve based on a total damage of the valve wherein the total damage is a function of creep damage and fatigue damage to the valve.

In another aspect, an Online Valve Lifetime Counter (OVLIC) includes a processor communicatively coupled to a memory device the memory device containing instructions that when executed by the processor, cause the processor to receive signals relating to temperature and pressure operational parameters of a valve, determine a creep stress acting on the valve using the temperature and pressure operational parameters of the valve between a first time and a second time, and determine a number and a severity of stress cycles acting on the valve between the first time and the second time. The instructions further cause the processor to determine a fatigue stress acting on the valve using the temperature and pressure operational parameters of the valve, accumulate the determined creep stress and the determined fatigue stress between the first time and the second time, and determine an estimated life remaining and a life consumption rate based on the accumulated creep stress and the accumulated fatigue stress.

In yet another aspect, a computer-implemented method for determining an estimated life remaining in a component is provided. The method is implemented using a processor coupled to a user interface and a memory device. In the example embodiment, the method includes receiving information indicative of a total creep stress in the component acting in the component over time, receiving information indicative of a total fatigue stress in the component acting in the component over time, determining a total stress in the component over time using the received information, and determining an estimated life remaining in the component and a consumption rate of the determined estimated life remaining.

DETAILED DESCRIPTION

Figure 1:
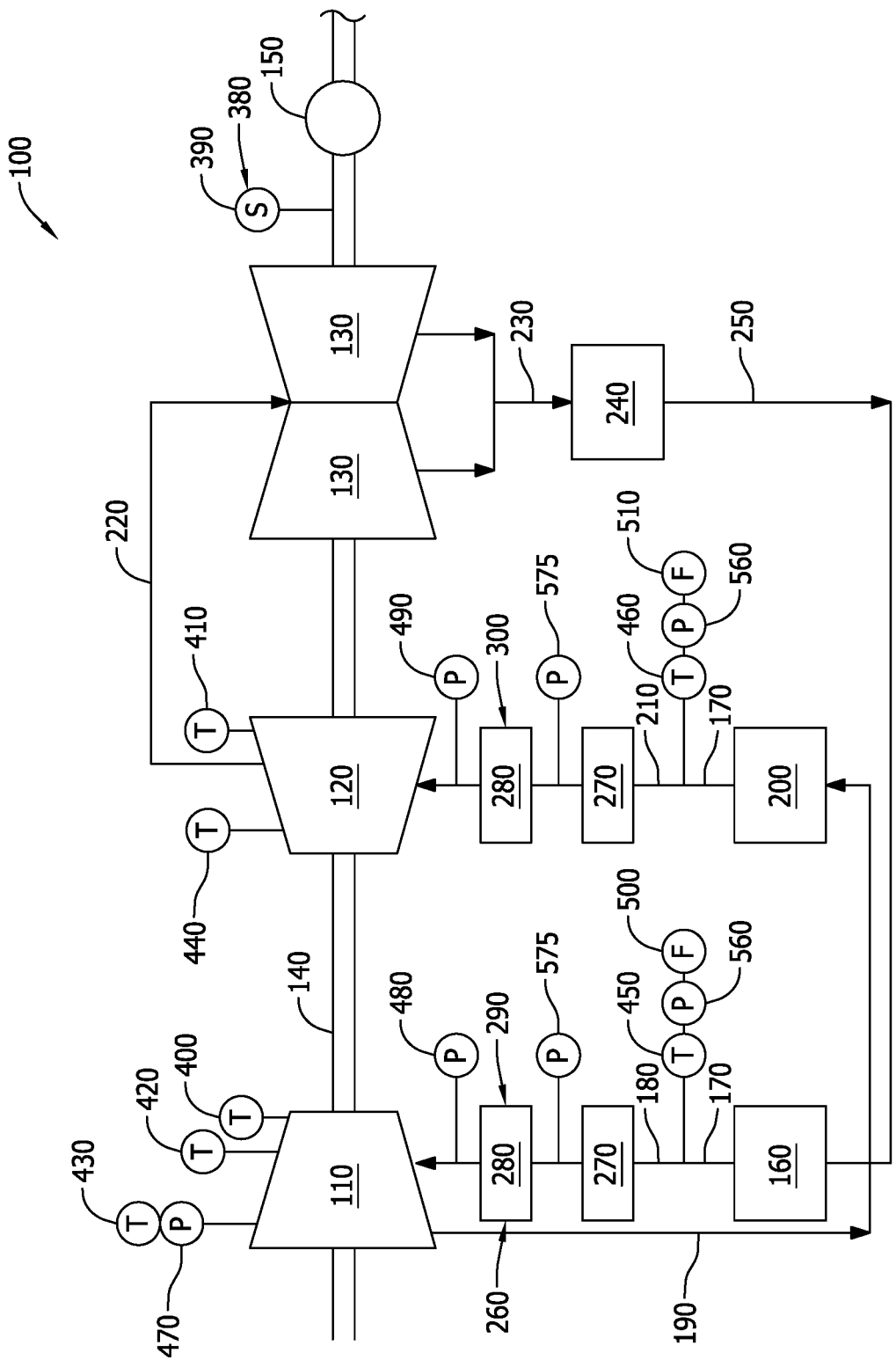
FIG. 1 is a schematic diagram of a steam turbine system as described herein.

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The Online Valve Lifetime Counter (OVLIC) described herein provides a cost-effective method for providing lifetime consumption of the valve (valve chest and valve internals) than is currently available. The OVLIC monitors the temperature, temperature differences, pressures, pressure differences and the spindle position of the valve. Based on this monitoring system, the plant operator can order spare parts or prepare for a detailed testing of the valve parts. The OVLIC may be embodied as a standalone monitoring system or may be incorporated as a module of a larger monitoring or operating system, for example, a Valve and Actuator Monitoring System (VAMS) or a Turbine Monitoring System (TMS). The VAMS or TMS are systems that continuosly monitor valves, actuators, and/or turbines. When the OVLIC receives signals representing various temperatures and temperature differences, for example, valve bore gradient, valve wall gradient, diffuser gradient and representing pressure and pressure differences from pressure sensors before and after stop and control valve and from the control valve spindle position, the OVLIC determines stress on the valve over time and generates a counter indicating a life left in the valve before maintenance or replacement should be peformed.

Based on the measurements, pressure induced stresses and thermal stresses can be determined. With the stress history, cyclic and creep damage can be derived for the valve chest and the autoclave joint, as well as other monitored locations of the plurality of valves.

As used herein, the total damage or distress of the metal of a valve or turbine casing is related to creep damage combined with fatigue damage. Creep damage represents damage to metal that occurs under stress and temperature and time. Fatigue damage represents damage to metal that occurs when stress is changing. The pattern of stresses increasing and decreasing is called a stress cycle. Several stress cycles can lead to cracks. Fatigue damage depends on at least the number of stress cycles, a magnitude of the stress induced into the metal during the stress cycles, and/or operating temperature of the metal. A stress induces a strain. A cyclic stress leads to a cyclic strain. Instead of depending on the cyclic stress, the fatigue damage can be described also in dependence of the cyclic strain. Fatigue damage may be determined using a trend of differential temperature from a cold metal condition to an operating temperature range of at least one valve of the plurality of valves. Fatigue damage may also be determined using a time rate of change of temperature between the cold metal condition and the operating temperature range.

As described herein, fatigue damage is mainly a build-up due to thermal stresses, i.e. during start-up of the turbine (steam temperature is increasing) or shut-down of turbine (steam temperature is decreasing). Because the wall of the valve or turbine casing is relatively thick, a temperature change along the inside of the casing, where the hot steam is in contact, is not immediately conducted to the outside of the casing. This leads to a temperature difference between inner side of the wall and outer side of the wall. This temperature difference or gradient creates a stress in the wall (so called "thermal stress"). Total damage may be represented simply as "total damage"="creep damage"+"fatigue damage." However, this formula is a simplification. In general, the total damage is a function of creep damage and fatigue damage, not necessarily a sum.

The OVLIC performs the evaluation automatically, and in real-time or near real-time. The results of the evaluation may be displayed to the plant operator e.g. on a terminal and e.g. with a GUI (graphical user interface), or output in an automatically written detailed report on demand. After receiving a warning from the OVLIC of an increased damage rate or lifetime consumption rate, the plant operator can selectively change the operation of the valve to reduce the damage rate or lifetime consumption rate. After receiving a warning from the OVLIC that a critical damage rate or critical lifetime consumption rate is exceeded or is approaching, the plant operator can perform further checks (e.g. with an inspection) or request a residual lifetime study.

The Online Valve Lifetime Counter (OVLIC) gives the plant operator a more accurate overview of the condition of the valve and turbine. Moreover, the OVLIC indicates whether the low cycle fatigue (LCF) and/or creep damage value or rate is above warning values. An early warning is given, before damage starts to become important to operation. Also based on the evaluation results, a plant operator can correct the operation mode (e.g. reduce temperature) or prepare better for the planned inspections, perform testing, such as, but not limited to non-destructive testing, and/or order spare parts for repairing and/or restoring the valve in advance of an outage.

FIG. 1 is a schematic diagram of a rotatable machine system such as, but not limited to, a steam turbine system 100 described herein. In the example embodiment, steam turbine system 100 may include a high pressure section 110, an intermediate pressure section 120, and a low pressure section 130. High pressure section 110, intermediate pressure section 120, and low pressure section 130 may be positioned on and may drive a rotor shaft 140. Rotor shaft 140 also may drive a generator 150 for the production of electrical power or for other types of useful work. Steam turbine system 100 may have any suitable size, shape, configuration, or capacity.

A boiler 160 or the like may produce a flow of steam 170. Boiler 160 and steam 170 may be in communication with high pressure section 110 via a high pressure line 180. Steam 170 may drive high pressure section 110 and exit high pressure section 110 via a cold reheat line 190. Cold reheat line 190 may be in communication with a reheater 200 (i.e., boiler 160 or part thereof). Reheater 200 may reheat the flow of steam 170. Reheater 200 and the flow of steam 170 may be in communication with intermediate pressure section 120 via an intermediate pressure line 210. The flow of steam 170 may drive intermediate pressure section 120 and may exit intermediate pressure section 120 via a low pressure line 220. The flow of steam 170 then may drive low pressure section 130 and may exit via a condenser line 230 to a condenser 240. The now condensed flow of steam 170 then may be returned to boiler 160 as feedwater or directed elsewhere. Other types of cycles and other types of components may be used herein.

Steam turbine system 100 may include a number of steam valves 260. Steam valves 260 may include a stop valve 270 and a control valve 280. Specifically, a high pressure stop valve and control valve 290 may be positioned on high pressure line 180 while an intermediate pressure stop and control valve 300 may be positioned on intermediate pressure line 210. Other types of valves and other locations may be used herein.

Figure 2:
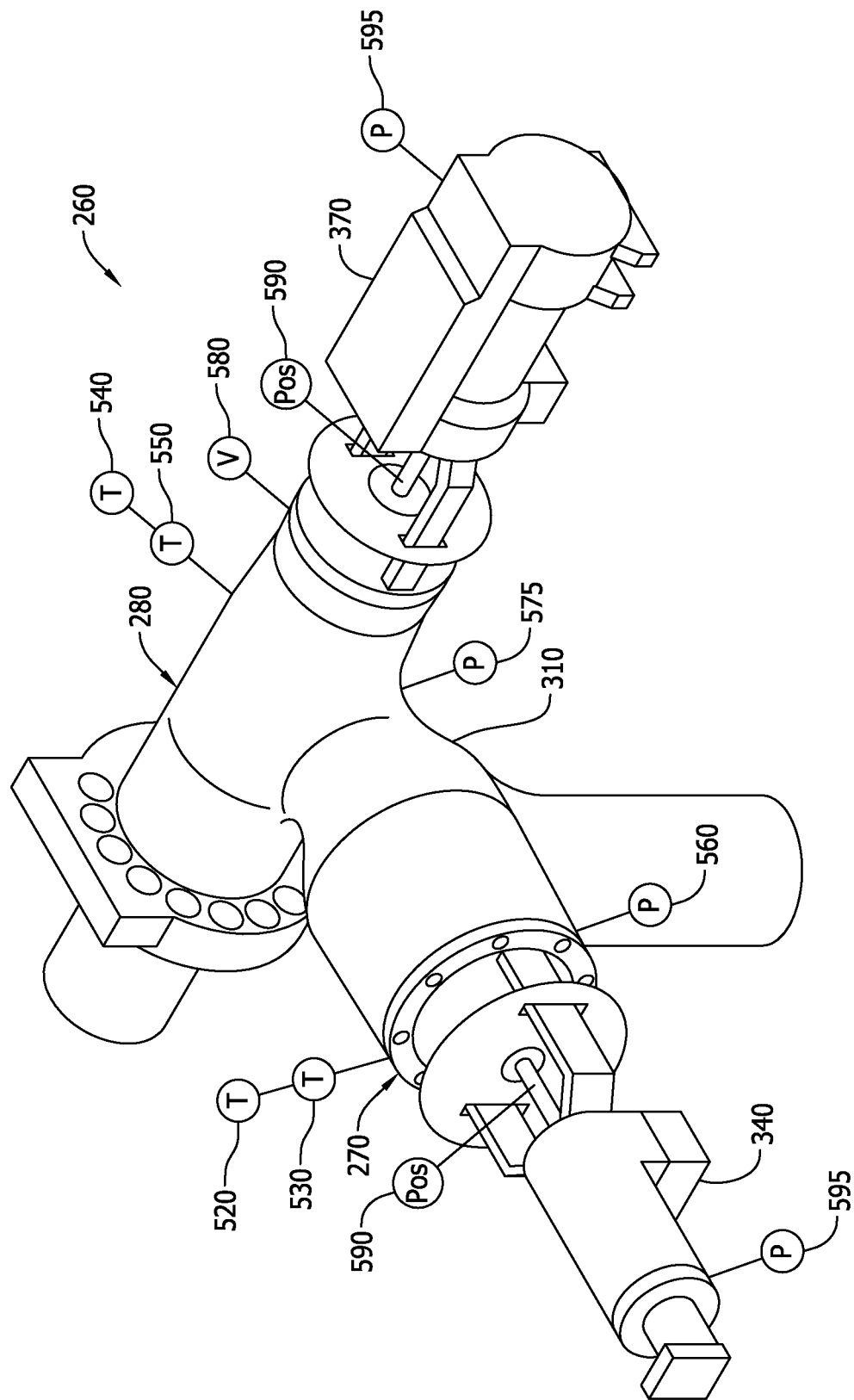
FIG. 2 is a partial perspective view of an exemplary combined stop valve and control valve that may be used with the steam turbine system of FIG. 1.
Figure 3:
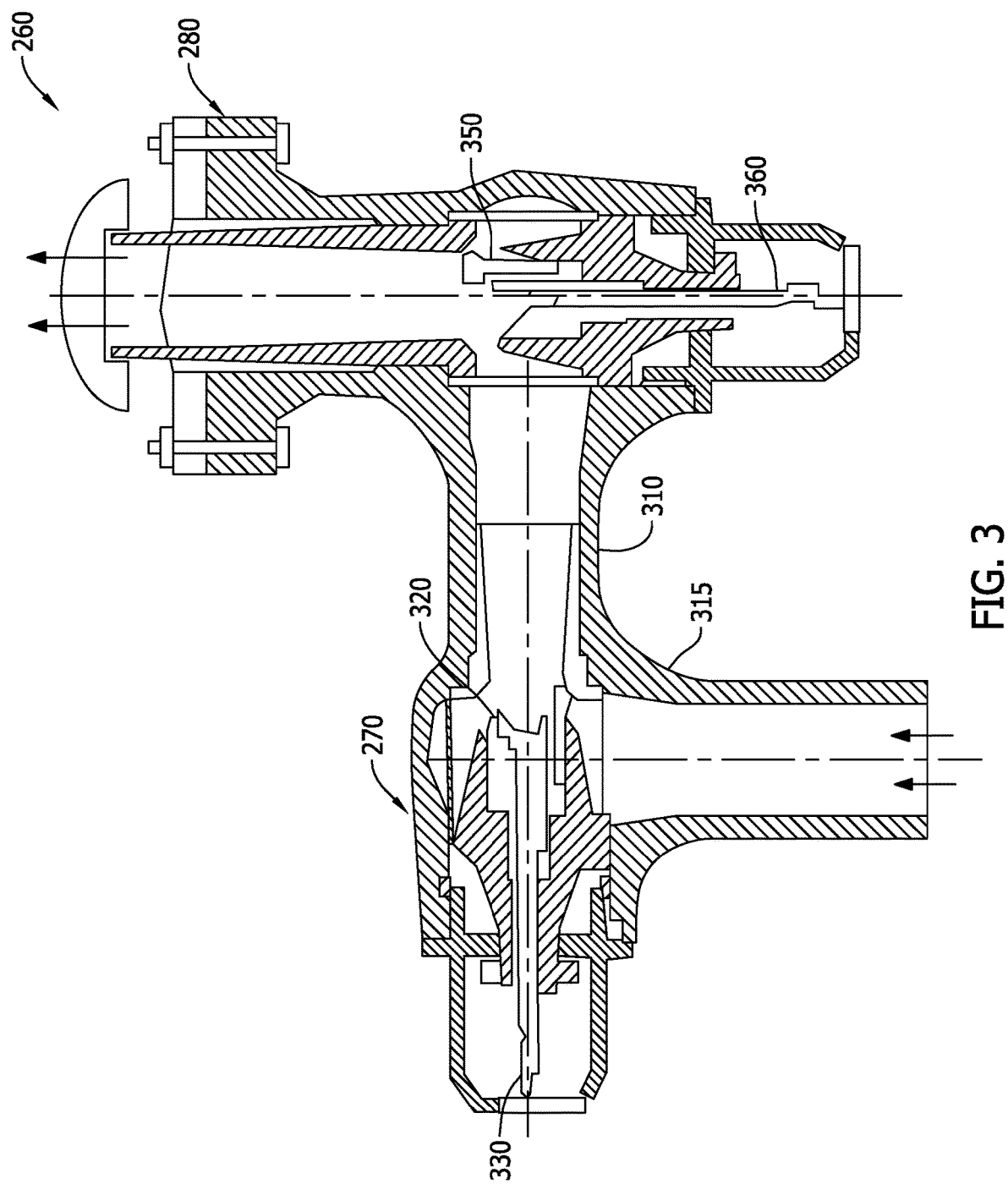
FIG. 3 is a partial cross-sectional view of the combined stop valve and control valve of FIG. 2.

As is shown in FIG. 2 and FIG. 3, high pressure stop valve and control valve 290 and intermediate pressure stop and control valve 300 may include stop valve 270 and control valve 280 positioned within a common casing 310. Casing 310 may include one or more layers of insulation 315. Stop valve 270 may include a stop valve closing member 320. Stop valve closing member 320 may be driven by a stop valve spindle 330. Stop valve spindle 330 may in turn be driven by a stop valve actuator 340. Similarly, control valve 280 may include a control valve closing member 350, a control valve spindle 360, and a control valve actuator 370. Steam valves 260 described herein are for the purpose of example only. Many other types of steam valves 260 and components thereof may be used herein in any suitable size, shape, or configuration.

Steam turbine system 100 may include a number of sensors 380. Sensors 380 may gather data on any type of operational parameter or the like. By way of the example, sensors 380 may include a speed sensor 390. Speed sensor 390 may be positioned about rotor shaft 140 so as to determine the speed and acceleration thereof. Sensors 380 may include a number of metal temperature sensors such as a high pressure section metal temperature sensor 400 and an intermediate pressure section metal temperature sensor 410. Metal temperature sensors 400, 410 may be positioned about rotor shaft 140 in high pressure section 110 and intermediate pressure section 120. Sensors 380 also may include a number of steam temperature sensors. The steam temperature sensors may include a high pressure section inlet temperature sensor 420 and a high pressure section outlet temperature sensor 430 positioned about high pressure section 110 and an intermediate pressure section inlet temperature sensor 440 positioned about intermediate pressure section 120. The steam temperature sensors also may include a high pressure valve temperature sensor 450 positioned about high pressure stop and control valve 290 and an intermediate pressure valve temperature sensor 460 positioned about intermediate pressure stop and control valve 300.

Sensors 380 may include a number of steam pressure sensors. The steam pressure sensors may include a high pressure section exhaust pressure sensor 470 positioned about high pressure section 110, a high pressure valve pressure sensor 480 positioned downstream of high pressure stop and control valve 290, and an intermediate pressure valve pressure sensor 490 positioned downstream of intermediate pressure stop and control valve 300. Sensors 380 also may include a number of mass flow sensors. The mass flow rate sensors may include a high pressure valve flow rate sensor 500 positioned about high pressure stop and control valve 290 and an intermediate pressure valve flow rate sensor 510 positioned about intermediate pressure stop and control valve 300.

High pressure stop valve and control valve 290 and intermediate pressure stop and control valve 300 themselves also may include a number of sensors. These valves may include a stop valve inner casing temperature sensor 520 at an inner wall, a stop valve outer casing temperature sensor 530 at an outer wall, a control valve inner casing temperature sensor 540 at an inner wall, and a control valve outer casing temperature sensor 550 at an outer wall. Stop valve 270 may have an inlet pressure sensor 5600. A middle pressure sensor 575 may be positioned between stop valve 270 and control valve 280. Control valve spindle 360 may include a vibration sensor 580 while stop valve actuator 340 and control valve actuator 370 may have a position sensor 590 positioned on the shafts therein as well as a hydraulic pressure valve 595. Sensors 380 described herein are for the purpose of example only. Many other and different types of sensors also may be used herein.

Figure 4:
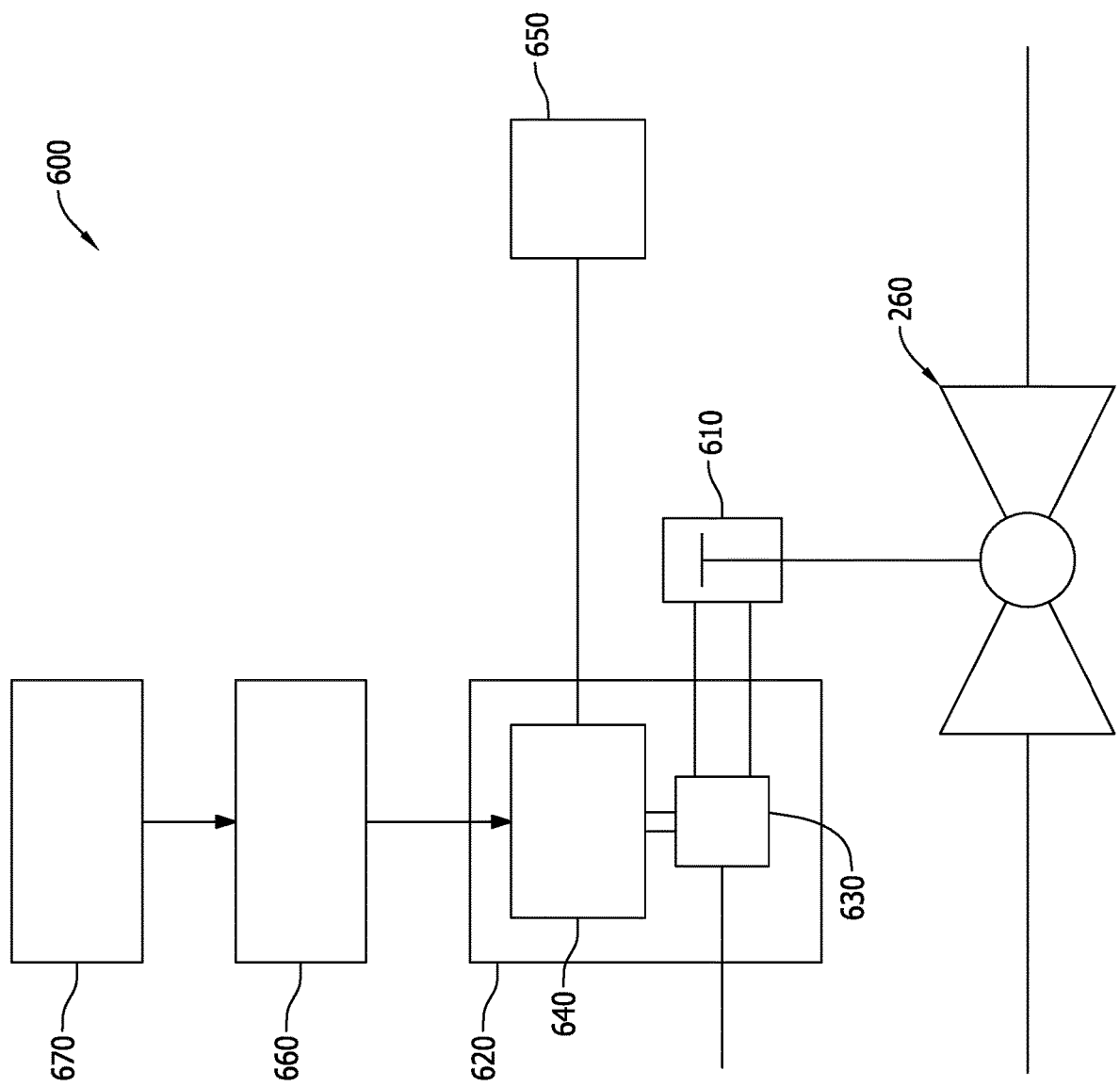
FIG. 4 is a schematic diagram of an exemplary distributed control system for use with the combined stop valve and control valve of FIG. 2.

FIG. 4 is an exemplary valve monitoring and control system 600 that may be used with any of steam valves 260 described above or the like. As shown above, steam valve 260 may be operated via an actuator 610. Specifically, steam valve 260 may be controlled via an electro-hydraulic converter 620 operatively coupled to actuator 610. Electro-hydraulic converter 620 may include a converter valve 630 and a valve controller 640. Electro-hydraulic converter 620 converts an electric control signal into a corresponding hydraulic pressure for actuator 610. Valve controller 640 may be in communication with installation and commissioning tool 650. Installation and commissioning tool 650 may be embodied in a processor controlled device. Installation and commissioning tool 650 may be used for valve set up and for periodic or permanent measurements. Installation and commissioning tool 650 may be selectively coupled to electro-hydraulic converter 620. Any number of steam valves 260 may be controlled via a turbine governor 660 in communication with a distributed control system 670. In various embodiments, valve control system 600 can provide online monitoring and integration into an existing monitoring system. Input from various sensors 380 may be in communication with turbine governor 660 and/or distributed control system 670 as may be required. Other components and other configurations may be used herein.

Figure 5:
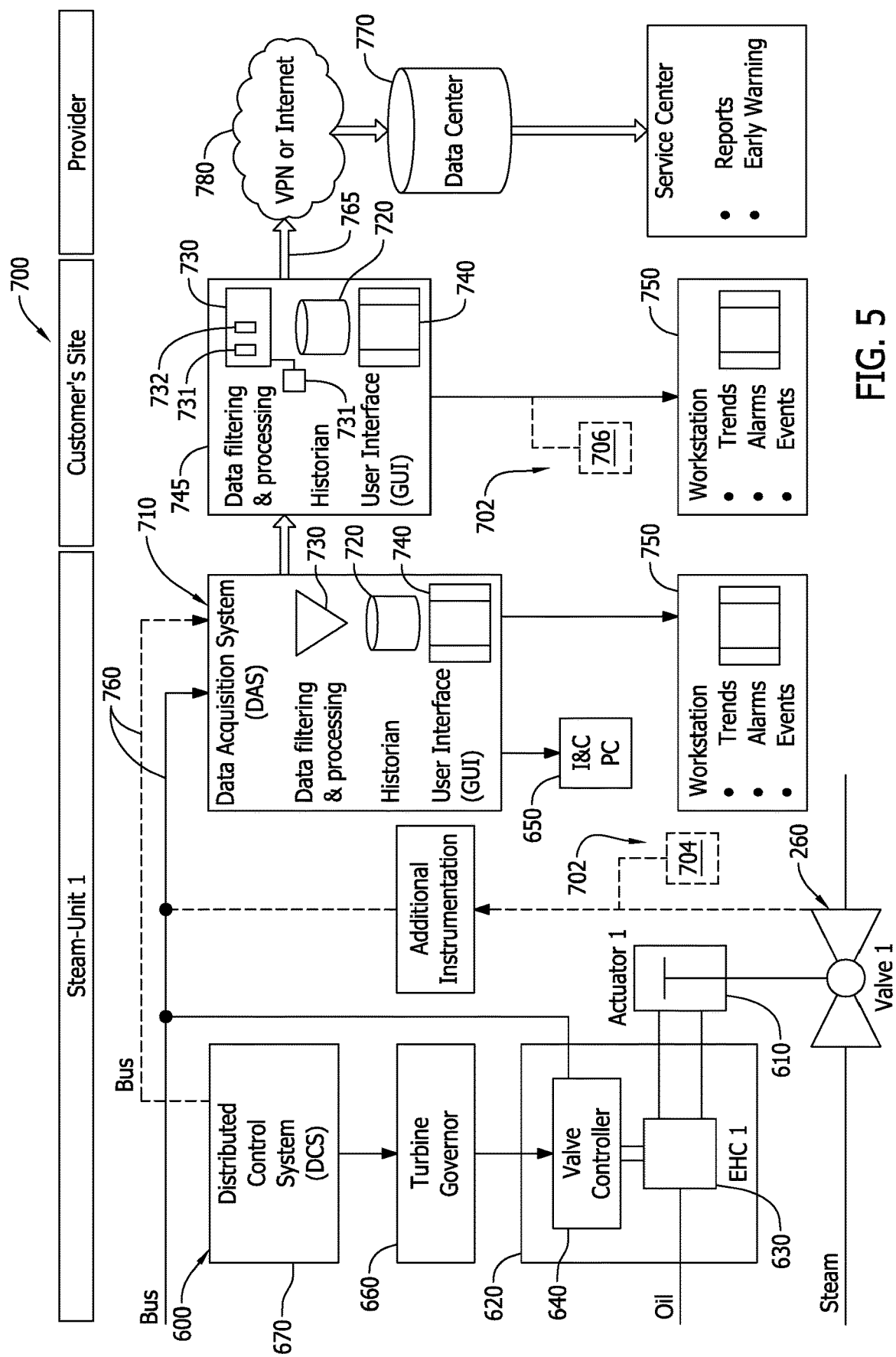
FIG. 5 is a schematic diagram of an exemplary valve and actuator monitoring system (VAMS) as described herein.

FIG. 5 is an exemplary valve and actuator monitoring system (VAMS) 700 and an Online Valve Lifetime Counter (OVLIC) 702. In the example embodiment, VAMS 700 assesses a condition of steam valves 260 based on continuous monitoring and OVLIC 702 monitors the temperature, temperature differences and gradients, pressures, pressure differences and the spindle position of for example, steam valve 260 to determine an approximate lifetime left in steam valve 260. The OVLIC may be embodied as a standalone monitoring system 704 or may be incorporated as a module 706 of, for example, VAMS 700. Additionally, OVLIC 702 may be embodied in a hybrid configuration where portions of the functionality of OVLIC 702 are performed by standalone OVLIC 702 and other portions of the functionality of OVLIC 702 are performed by OVLIC module 706. VAMS 700 may provide real time monitoring of steam valves 260 for condition assessment, predictive maintenance, correction, ordering spare parts, or the like. VAMS 700 may include a data acquisition system 710. Elements of data acquisition system 710 may be used to acquire operational data of steam valves 260 and control operation thereof and operational data of the steam turbine and the steam plant. OVLIC 702 may share sensor and other data with VAMS 700 or may have dedicated sensors used only by OVLIC 702.

Data acquisition system 710 may include a historian 720. Historian 720 may be software and may or may not include database functions. Historian 720 interfaces with programmed logic via calculators and runs on data available therein. Historian 720 may store data received from sensors 380 or the like and processed data. Historian 720 may be able to record non-scalar data as well as scalar data. Valve controller 640 may provide high speed recording for events with data output in a non-scalar format. Other types of databases and platforms may be used herein. Data acquisition system 710 may import programmed logic implemented by software, hardware, firmware, or any combination thereof. Historians 720 may be cascaded such that one historian 720 may run on a server and collect data from a number of VAMS 700. Likewise, multiple data acquisition systems 710 may be used such that different features described herein may be executed on one or more of such different systems.

Data acquisition system 710 also may include a processor 730 communicatively coupled to a memory device 731, which may be embodied in a memory onboard processor 730 or may be embodied in a memory located remotely from processor 730. Memory device 731 may be a shared memory, between for example, OVLIC 702, VAMS 700, Data acquisition system 710, and/or other systems. Processor 730 may provide data filtering and processing. Processor 730 may utilize an operating system to execute program logic and, in doing so, also may utilize the measured data found on historian 720. Processor 730 may include a calculator 732 for computations. Calculator 732 may be a freely programmable computation engine and can be written for historian 720. The program languages may include Python, C/C++, or the like. Data acquisition system 710 receives available data and makes computation as to the assessment thereof.

Users may interface with data acquisition system 710 via a graphical user interface 740. Graphical user interface 740 may include a display, keyboard, keypad, a mouse, control panel, a touch screen display, a microphone, or the like so as to facilitate user interaction. Specifically, graphical user interface 740 may support a work station 750 wherein data acquisition system 710 may provide trends, alarms, events, or the like. Data output by data acquisition system 710 may be available to customers via graphical user interface 740. Graphical user interface 740 may be in communication with historian 720 and processor 730. All available data such as measurements, processed data, or the like thus will be easily accessible.

Data acquisition system 710 may be in communication with valves 260 and sensors 380 and the other components herein via one or more data busses 760. VAMS 700 may operate unattended, without user interaction. Other components and other configurations may be used herein. Data acquisition system 710 may be positioned locally at steam turbine system 100 and/or remotely at a customer's location. A number of data acquisition systems 710 may be in communication with a client acquisition system 745. Client acquisition system 745 may have a similar configuration and components. Moreover, historian 720 at client acquisition system 745 at the customer site may collect data across multiple steam valves 260.

Data acquisition systems 710 and/or client acquisition systems 745 also may be in communication with a central data center 770. Central data center 770 may be in communication with data acquisition systems 710 and or client acquisition systems 745 via a virtual private network or Internet 780 via a data collection in transmission tool 765, a secure file transfer, or the like. Further processing may be performed at central data center 770. Other components and other configurations may be used herein.

In one embodiment, OVLIC 702 includes or is communicatively coupled to a processor, such as, but not limited to, processor 730. When executing programmed instructions stored on a memory device, OVLIC 702 receives signals relating to temperature and pressure operational parameters of a valve or a plurality of valves. In one embodiment, OVLIC 702 is configured to receive a first temperature signal from a first temperature sensor located at a first position and receive a second temperature signal from a second temperature sensor located at a second position. OVLIC 702 is then able to determine an axial temperature gradient or a radial temperature gradient between the first position and the second position. OVLIC 702 also is configured to determine a creep stress acting on the valve using the temperature and pressure operational parameters of the valve or plurality of valves between a first time and a second time.

OVLIC 702 further determines a number and a severity of stress cycles acting on the valve between the first time and the second time and determines determine a fatigue stress acting on the valve using the temperature and pressure operational parameters of the valve. OVLIC 702 accumulates the determined creep stress and the determined fatigue stress between the first time and the second time and determines an estimated life remaining in the valve or plurality of valves and a respective life consumption rate based on the accumulated creep stress and the accumulated fatigue stress. OVLIC 702 may also be configured to recommend a course of action to reduce the life consumption rate of the valve, the course of action including altering at least one of an operating pressure of the valve, a spindle position, a mass flow rate of fluid through the valve, and removing the valve from service.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. As described above, these computer program instructions may be loaded onto a general purpose computer, a special purpose computer, a special purpose hardware-based computer, or other type of programmable data processing apparatus to produce a machine, such that the instructions that execute on the computer or other programmable data processing apparatus create means for implementing the functionality of at least some of the blocks of the block diagrams, or combinations of blocks in the block diagrams discussed below.

These computer program instructions also may be stored in a non-transitory, computer-readable memory that can direct the computer or other programmable data processing apparatus to function in a particular manner, such that the instructions stored in the computer-readable memory produce an article of manufacture including instruction means that implement the functions specified in the block or blocks. The computer program instructions also may be loaded onto a computer or other programmable data processing apparatus to create a series of operational steps to be performed on the computer or other programmable apparatus to produce a computer implemented process such that the instructions that are executed on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand held devices, multiprocessor systems, microprocessor-based or programmable consumer electronics, mini-computers, mainframe computers, or the like. Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

VAMS 700 thus may provide real time monitoring of the various valves and actuators. Specifically, VAMS 700 thus may provide real time status information, messages, warnings, and lifetime consumption information so as to provide determinations and predictions by comparing the actual data to design data. The following modules describe different types of inspection and monitoring techniques and methods that may be used herein. Many other and different modules and methods may be used herein, separately or together.

Figure 6:
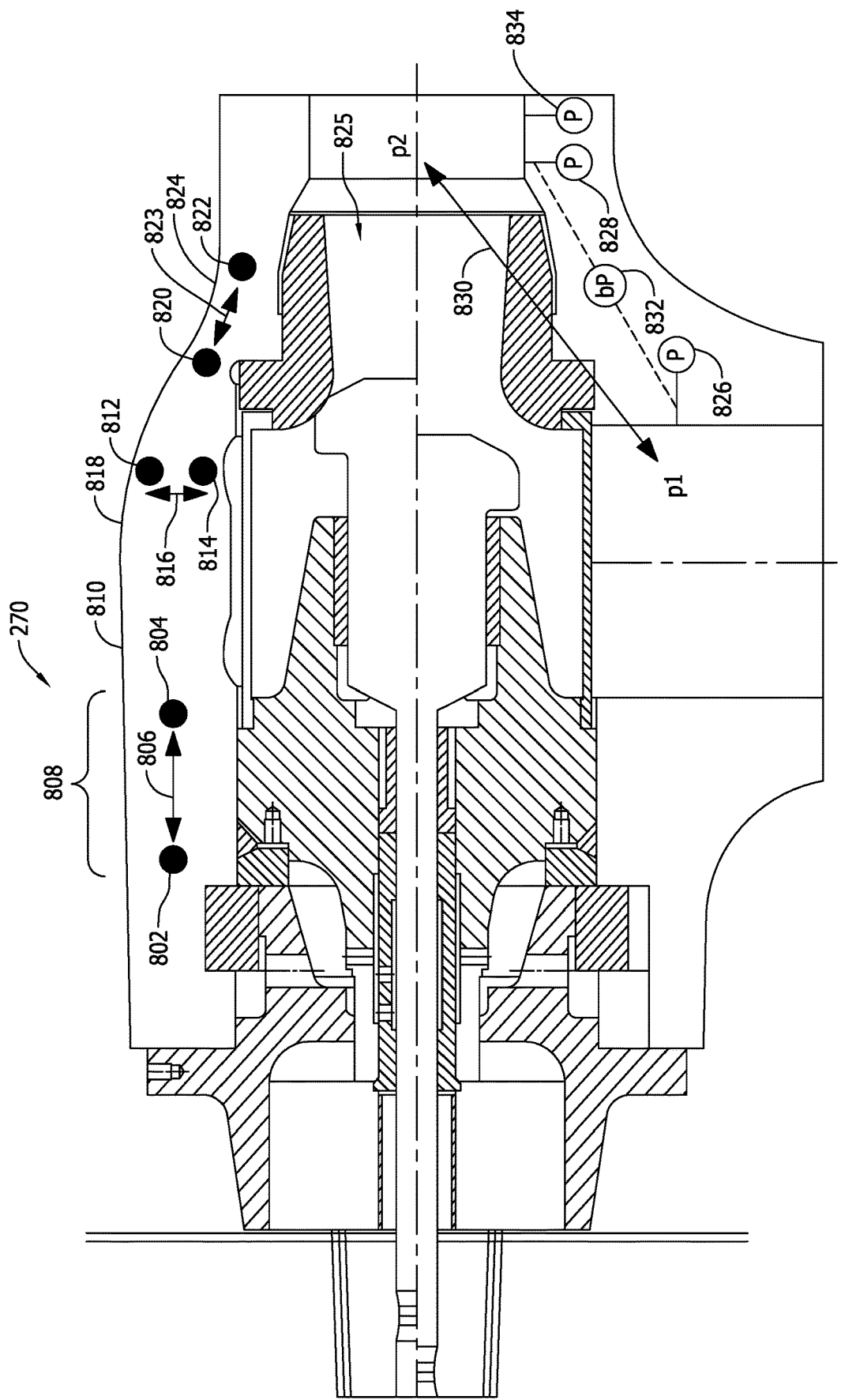
FIG. 6 is a cross-sectional view of an exemplary stop valve that may be used with an online valve lifetime counter (OVLIC) shown in FIG. 5.

FIG. 6 is a cross-sectional view of an exemplary stop valve 270 that may be used with OVLIC 702 (shown in FIG. 5). In the example embodiment, stop valve 270 includes a plurality of sensors that may be used only by OVLIC 702 or may be also used by VAMS 700. For example, stop valve 270 includes a first valve bore temperature sensor 802 and a second valve bore temperature sensor 804. Using first valve bore temperature sensor 802 and second valve bore temperature sensor 804, OVLIC 702 is configured to determine a differential temperature 806 in a valve bore area 808 of a sidewall 810 of valve 270. In various embodiments, first valve bore temperature sensor 802 and second valve bore temperature sensor 804 are displaced axially along sidewall 810. Accordingly, first valve bore temperature sensor 802 and second valve bore temperature sensor 804 can be used to provide an indication of an axial stress acting on stop valve 270.

Stop valve 270 also includes a first wall temperature sensor 812 and a second wall temperature sensor 814. Using first wall temperature sensor 812 and second wall temperature sensor 814, OVLIC 702 is configured to determine a differential temperature 816 in a wall area 818 of sidewall 810. In various embodiments, first wall temperature sensor 812 and second wall temperature sensor 814 are displaced radially across sidewall 810. Accordingly, first wall temperature sensor 812 and second wall temperature sensor 814 can be used to provide an indication of a radial stress acting on stop valve 270.

In the example embodiment, valve bore area 808 and wall area 818 are shown spaced from each other and first valve bore temperature sensor 802 and second valve bore temperature sensor 804 and first wall temperature sensor 812 and a second wall temperature sensor 814 are shown as separate pairs of sensors. In other embodiments, valve bore area 808 and wall area 818 may represent the same area of sidewall 810 and differential temperature 806 and differential temperature 816 may be determined using only three temperature sensors where one temperature sensor is shared between the two pairs of sensors for determining differential temperature.

Additionally, as shown spaced apart, all four of first valve bore temperature sensor 802, second valve bore temperature sensor 804, first wall temperature sensor 812, and second wall temperature sensor 814 may be used to determine a temperature gradient between the locations of the four sensors. The gradient may be correlated to various operating parameters of the steam plant of which stop valve 270 forms a part.

Stop valve 270 also includes a first diffuser temperature sensor 820 and a second diffuser temperature sensor 822. Using first diffuser temperature sensor 820 and second diffuser temperature sensor 822, OVLIC 702 is configured to determine a differential temperature 823 in diffuser area 824 of sidewall 810. First diffuser temperature sensor 820 and a second diffuser temperature sensor 822 may also be used as a part of the gradient temperature determinations. The temperature gradients may be oriented in a radial direction with respect to a bore 825 of stop valve 270 or may be oriented in an axial direction with respect to bore 825 of stop valve 270.

Stop valve 270 also includes a first seat pressure sensor 826 and a second seat pressure sensor 828. Using first seat pressure sensor 826 and second seat pressure sensor 828, OVLIC 702 is configured to determine a differential pressure 830 across stop valve 270. In some embodiments, first seat pressure sensor 826 and second seat pressure sensor 828 are embodied in a single pressure differential sensor 832.

Stop valve 270 also includes a first control valve pressure sensor 834 and a second control valve pressure sensor 836. Using first control valve pressure sensor 834 and second control valve pressure sensor 836, OVLIC 702 is configured to determine a differential pressure 838 across control valve 280. In some embodiments, first control valve pressure sensor 834 and second control valve pressure sensor 836 are embodied in a single pressure differential sensor 840.

Figure 7:
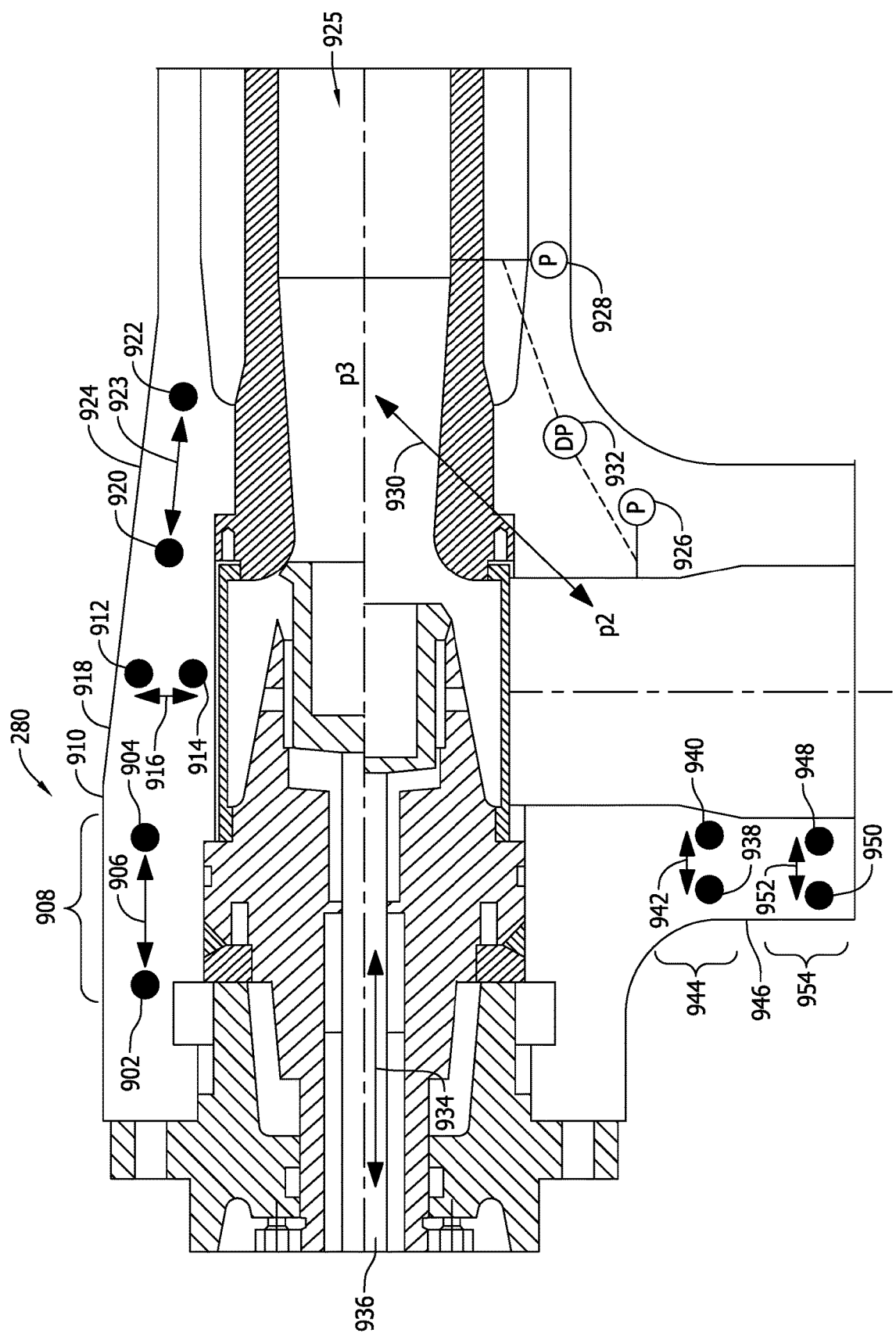
FIG. 7 is a cross-sectional view of an exemplary control valve that may be used with the OVLIC shown in FIG. 5.

FIG. 7 is a cross-sectional view of an exemplary control valve 280 that may be used with OVLIC 702 (shown in FIG. 5). In the example embodiment, control valve 280 includes a plurality of sensors that may be used only by OVLIC 702 or may be also used by VAMS 700. For example, control valve 280 includes a first valve bore temperature sensor 902 and a second valve bore temperature sensor 904. Using first valve bore temperature sensor 902 and second valve bore temperature sensor 904, OVLIC 702 is configured to determine a differential temperature 906 in a valve bore area 908 of a sidewall 910 of valve 270.

Control valve 280 also includes a first wall temperature sensor 912 and a second wall temperature sensor 914. Using first wall temperature sensor 912 and second wall temperature sensor 914, OVLIC 702 is configured to determine a differential temperature 916 in a wall area 918 of sidewall 910.

In the example embodiment, valve bore area 908 and wall area 918 are shown spaced from each other and first valve bore temperature sensor 902 and second valve bore temperature sensor 904 and first wall temperature sensor 912 and a second wall temperature sensor 914 are shown as separate pairs of sensors. In other embodiments, valve bore area 908 and wall area 918 may represent the same area of sidewall 910 and differential temperature 906 and differential temperature 916 may be determined using only three temperature sensors where one temperature sensor is shared between the two pairs of sensors for determining differential temperature.

Additionally, as shown spaced apart, all four of first valve bore temperature sensor 902, second valve bore temperature sensor 904, first wall temperature sensor 912, and second wall temperature sensor 914 may be used to determine a temperature gradient between the locations of the four sensors. The gradient may be correlated to various operating parameters of the steam plant of which control valve 280 forms a part.

Control valve 280 also includes a first diffuser temperature sensor 920 and a second diffuser temperature sensor 922. Using first diffuser temperature sensor 920 and second diffuser temperature sensor 922, OVLIC 702 is configured to determine a differential temperature 923 in a diffuser area 924 of a bore 925 of sidewall 910. First diffuser temperature sensor 920 and a second diffuser temperature sensor 922 may also be used as a part of the gradient temperature determinations. The temperature gradients may be oriented in a radial direction with respect to bore 925 of control valve 280 or may be oriented in an axial direction with respect to bore 925 of control valve 280.

Control valve 280 also includes a first seat pressure sensor 926 and a second seat pressure sensor 928. Using first seat pressure sensor 926 and second seat pressure sensor 928, OVLIC 702 is configured to determine a differential pressure 930 across control valve 280. In some embodiments, first seat pressure sensor 926 and second seat pressure sensor 928 are embodied in a single pressure differential sensor 932. The pressure downstream of control valve 280 may also be determined using a position 934 of a spindle 936 of control valve 280 and the upstream pressure sensed by first seat pressure sensor 926.

Control valve 280 also includes a first inlet throat temperature sensor 938 and a second wall temperature sensor 940. Using first inlet throat temperature sensor 938 and second wall temperature sensor 940, OVLIC 702 is configured to determine a differential temperature 942 in a necked-down throat area 944 of inlet sidewall 946.

Control valve 280 also includes a first inlet upstream temperature sensor 948 and a second inlet upstream temperature sensor 950. Using first inlet upstream temperature sensor 948 and second inlet upstream temperature sensor 950, OVLIC 702 is configured to determine a differential temperature 952 in an inlet upstream area 954 of inlet sidewall 946.

Using the temperature and pressure sensor associated with stop valve 270 and control valve 280, OVLIC 702 may generate a virtual sensor using the outputs of the temperature and pressure sensor in place around stop valve 270 and control valve 280 and a model of stop valve 270 and control valve 280. OVLIC 702 may then receive a temperature or pressure signal from the virtual temperature sensor or virtual pressure sensor, respectively.

As used herein, virtual sensor may refer to a mathematical algorithm or model that produces output measures comparable to a physical sensor based on inputs from other systems, such as physical sensors. OVLIC 702 may include a plurality of virtual sensors to predict or derive a sensing parameter where a corresponding physical sensor does not exist. In certain embodiments, OVLIC 702 may include a plurality of virtual sensor models. For example, OVLIC 702 may include a virtual temperature or pressure sensor to predict the sensing parameter of creep stress or fatigue stress.

Figure 8:
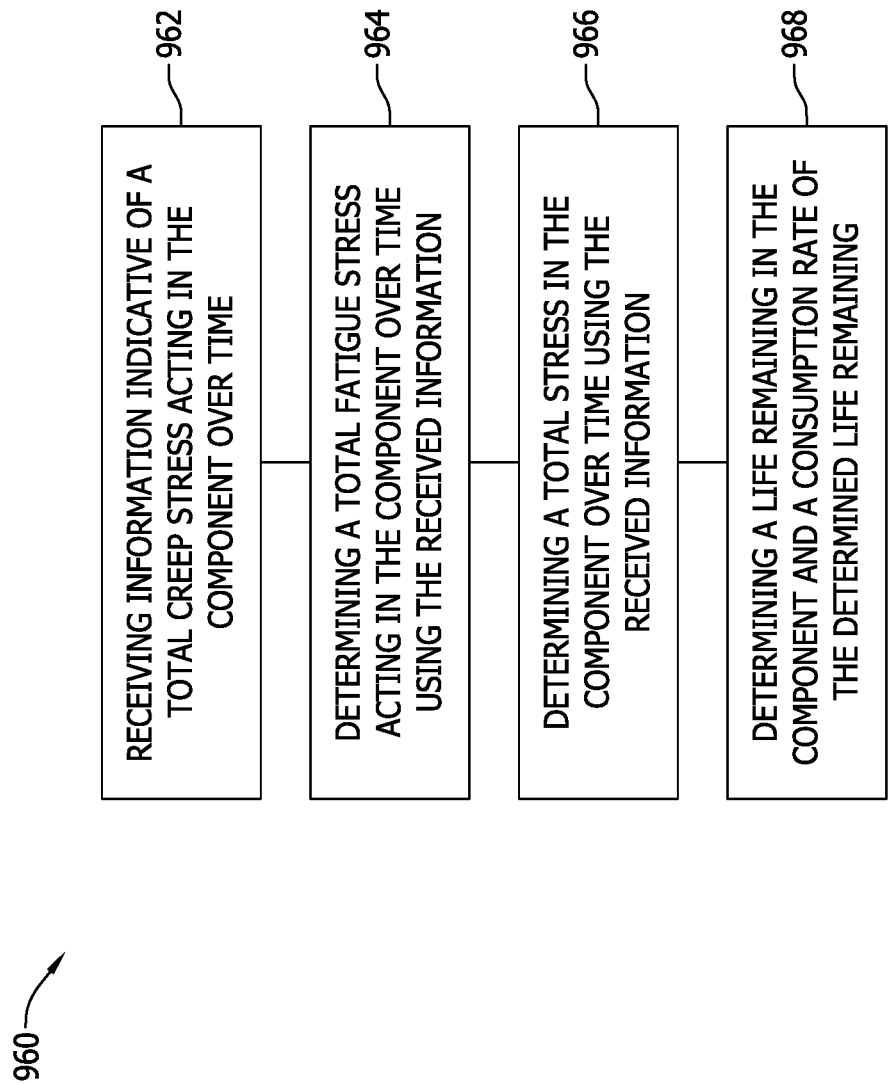
FIG. 8 is a flowchart of an exemplary computer-implemented method for determining a remaining life in a component.

FIG. 8 is a flowchart of an exemplary computer-implemented method 960 for determining a remaining life in a component. Method 960 is implemented using a processor coupled to a user interface and a memory device. In the example embodiment, method 960 includes receiving 962 information indicative of a total creep stress in the component acting in the component over time, receiving 964 information indicative of a total fatigue stress in the component acting in the component over time, determining 966 a total stress in the component over time using the received information, and determining 968 a life remaining in the component and a consumption rate of the determined life remaining. Method 960 optionally includes receiving information indicative of a creep stress in the component acting in a first direction in the component over time, receiving information indicative of a creep stress in the component acting in a second direction in the component over time, and determining a total creep stress over time using the received information. Method 960 may also include receiving information indicative of a creep stress in the component acting in a second direction in the component wherein the second direction is approximately orthogonal to the first direction. Method 960 may further include receiving information indicative of a number of and a severity of stress cycles acting on the component between the first time and the second time and determining a total fatigue stress acting on the component using the temperature and pressure operational parameters of the component and the received information indicating the number of and the severity of stress cycles acting on the component. Optionally, method 960 also includes combining the total creep stress and the total fatigue stress in the component to generate a total stress in the component. Method 960 may also include recommending actions to take to reduce a consumption rate of the determined life, the actions include altering at least one of an operating pressure of the valve, a spindle position, a mass flow rate of fluid through the valve, and removing the valve from service.

The above-described embodiments of a method and system of determining an amount of life left in a component and a rate of consumption of that life provides a cost-effective and reliable means for receiving values for operational parameters associated with the component and determining the amount of life left in the component. More specifically, the methods and systems described herein facilitate automatically determining the amount of life left in the component in real-time of near real-time. In addition, the above-described methods and systems facilitate using physical sensors and virtual sensors to monitor positons that are not or cannot be instrumented. As a result, the methods and systems described herein facilitate automatically providing an indicator of when maintenance or replacement should be planned in a cost-effective and reliable manner.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotatable machine system comprising:
   a plurality of valves coupled in flow communication with a rotatable machine of said rotatable machine system;
   a plurality of sensors configured to receive operating parameters associated with said rotatable machine and said plurality of valves; and
   an online valve lifetime counter (OVLIC), comprising a processor communicatively coupled to said plurality of sensors, said OVLIC configured to:
   receive a first temperature signal from a first temperature sensor of said plurality of temperature sensors, said first temperature sensor located at a first position on a body of a valve of said plurality of valves;
   receive a second temperature signal from a second temperature sensor of said plurality of temperature sensors, said second temperature sensor located at a second position on said body of said valve;
   determine at least one of an axial temperature gradient and a radial temperature gradient between the first position and the second position;
   determine a stress induced into the valve over time based on the at least one of the axial temperature gradient and the radial temperature gradient;
   determine a number and a severity of stress cycles acting on the valve over time; and
   determine life remaining in said valve based on a total damage of said valve wherein the total damage is a function of creep damage and fatigue damage to said valve.

2. The rotatable machine system of claim 1, wherein said OVLIC is further configured to determine a creep damage using the at least one of the axial temperature gradient and the radial temperature gradient and a time the at least one of the axial temperature gradient and the radial temperature gradient is present.

3. The rotatable machine system of claim 1, wherein said OVLIC is further configured to determine a fatigue damage using the at least one of the axial temperature gradient and the radial temperature gradient from a cold metal condition to an operating temperature range of at least one valve of the plurality of valves.

4. The rotatable machine system of claim 3, wherein said OVLIC is further configured to determine a fatigue damage using a time rate of change of temperature between the cold metal condition and the operating temperature range.

5. The rotatable machine system of claim 1, wherein said OVLIC is further configured to determine a magnitude of stress generated in the stress cycles.

6. The rotatable machine system of claim 1, wherein said OVLIC is further configured to output an estimated life remaining and a consumption rate of the estimated life.

7. The rotatable machine system of claim 1, wherein said OVLIC is further configured to output a recommendation of altering one or more of a plurality of operational parameters, the plurality of operational parameters includes altering at least one of an operating pressure of at least one valve of the plurality of valves, a spindle position of at least one valve of the plurality of valves, a mass flow rate of fluid through at least one valve of the plurality of valves, and removing at least one valve of the plurality of valves from service.

8. An online valve lifetime counter (OVLIC) comprising a processor communicatively coupled to a memory device, the memory device containing instructions that when executed by said processor, cause said processor to:
receive signals relating to temperature and pressure operational parameters of a valve, including:
receiving a first temperature signal from a first temperature sensor located at a first position; and
receiving a second temperature signal from a second temperature sensor located at a second position;
determine at least one of an axial temperature gradient and a radial temperature gradient between the first position and the second position;
determine a creep stress acting on the valve using the temperature and pressure operational parameters of the valve between a first time and a second time;
determine a number and a severity of stress cycles acting on the valve between the first time and the second time;
determine a fatigue stress acting on the valve using the temperature and pressure operational parameters of the valve;
accumulate the determined creep stress and the determined fatigue stress between the first time and the second time; and
determine a life remaining and a life consumption rate based on the accumulated creep stress and the accumulated fatigue stress.

9. The OVLIC of claim 8, wherein said instructions that when executed by said processor, cause said processor to receive a temperature or pressure signal from a virtual sensor.

10. The OVLIC of claim 8, wherein said instructions that when executed by said processor, cause said processor to:
determine a creep stress acting on the valve in a first direction;
determine a creep stress acting on the valve in a second direction; and
determine a total creep stress acting on the valve by combining the determined creep stress acting on the valve in the first direction and the determined creep stress acting on the valve in the second direction.

11. The OVLIC of claim 8, wherein said instructions that when executed by said processor, cause said processor to recommend a course of action to reduce the life consumption rate of the valve, the course of action including altering at least one of an operating pressure of the valve, a spindle position, a mass flow rate of fluid through the valve, and removing the valve from service.

12. The OVLIC of claim 8, wherein said instructions that when executed by said processor, cause said processor to output the determined life remaining of the valve and the life consumption rate of the valve.

13. A computer-implemented method for determining a remaining life in a valve of a plurality of valves of a rotatable machine, the method implemented using a processor coupled to a user interface and a memory device, the method comprising:
receiving information indicative of a total creep stress acting in the valve over time, including:
receiving information indicative of a creep stress in the valve acting in a first direction in the valve over time;
receiving information indicative of a creep stress in the valve acting in a second direction in the valve over time; and
determining the total creep stress over time using the received information;
receiving information indicative of a total fatigue stress acting in the valve over time;
determining a total stress acting in the valve over time using the received information; and
determining a life remaining in the valve and a consumption rate of the determined life remaining.

14. The method of claim 13, wherein receiving information indicative of a creep stress in the valve acting in a second direction in the valve comprises receiving information indicative of a creep stress in the valve acting in a second direction in the valve wherein the second direction is approximately orthogonal to the first direction.

15. The method of claim 13, wherein receiving information indicative of a total fatigue stress in the valve acting in the component over time comprises:
receiving information indicative of a number of and a severity of stress cycles acting on the valve between a first time and a second time; and
determining a total fatigue stress acting on the valve using a plurality of temperature and pressure operational parameters of the valve and the received information indicating the number of and the severity of stress cycles acting on the valve.

16. The method of claim 13, wherein determining a life remaining in the valve and a consumption rate of the determined life remaining comprises combining the total creep stress and the total fatigue stress in the valve.

17. The method of claim 13, further comprising recommending actions to take to reduce a consumption rate of the determined life, the actions include altering at least one of an operating pressure of the valve, a spindle position, a mass flow rate of fluid through the valve, and removing the valve from service.

* * * * *